Figure 1:
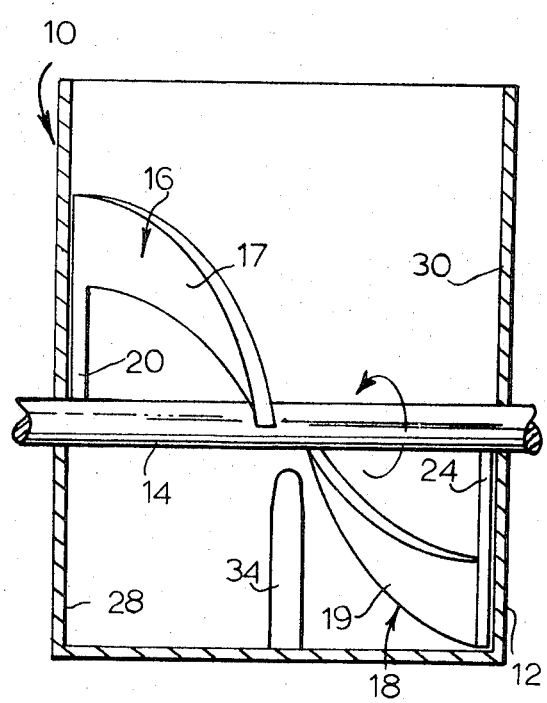

United States Patent

Lawson et al.

[15] 3,652,063
[45] Mar. 28, 1972

[54] MIXER

[72] Inventors: Robert Lawson, Amersham; Kenneth Oulton, Newton-le-Willows, both of England

[73] Assignee: T. & T. Vicars Limited, Earletown, Newton-le-Willows, England

[22] Filed: June 8, 1970

[21] Appl. No.: 44,438

[30] Foreign Application Priority Data

June 14, 1969 Great Britain......................30,273/69

[52] U.S. Cl. ...........................................................259/109
[51] Int. Cl. ..................................................................B01f 7/02
[58] Field of Search.......................259/9, 10, 25, 26, 45, 46, 259/68, 69, 109, 110, 5-7, 21-24, 32-34, 40-44, 64-67

[56] References Cited

UNITED STATES PATENTS

| 515,941 | 3/1894 | Savage | 259/109 |
| 594,533 | 11/1897 | Henius | 259/DIG. 18 |

FOREIGN PATENTS OR APPLICATIONS

| 105,125 | 4/1917 | Great Britain | 259/109 |

Primary Examiner—Patrick D. Lawson
Assistant Examiner—Geo. V. Larkin
Attorney—Beveridge & De Grandi

[57] ABSTRACT

A mixer having a single shaft, a pair of oppositely mounted helical blades rigidly attached to the shaft and a projection located between the blades, whereby in operation the blades move material in the mixer towards the projection and one another thus effecting thorough mixing of the material which may be a dough such as bread dough or sweet biscuit dough.

11 Claims, 3 Drawing Figures

INVENTOR:
ROBERT LAWSON & KENNETH OULTON
BY
Beveridge + DeGrandi
Attorneys

MIXER

The present invention relates to mixers.

According to the present invention there is provided a mixer comprising a single shaft, rotatably mounted in a container, the shaft having two helically shaped, or approximately helically shaped, blades rigidly mounted on the shaft in axially spaced relationship, the cross-section of a lower portion of the inner surface of the container conforming closely to the cross-section of the lower portion of the swept volumes of the two blades, and at least one projection mounted on the inner surface of the container and extending between the volumes swept by the two blades, the two blades being mounted on the shaft in opposite sense to each other and in a manner such that, in operation, the blades tend to move material in the container towards the portion of the container between the swept volumes of the two blades.

The mixer of the present invention is particularly suitable for mixing confectionery doughs which expression is intended to include all wet confectionary mixes, for example biscuit doughs e.g. hard sweet doughs, wafer batters, bread doughs and cake batters.

Where reference is made to mixing it is to be understood that similar operation such as beating are also included, and the expression "mixer" is therefore to be construed accordingly.

The blades may be wholly or partly solid or they may be perforate, e.g. in grid or mesh form, or they may consist of a number of strips in the shape of part helices rigidly attached to the shaft by struts. It is preferred to use solid blades when mixing thin (i.e. low viscosity) doughs, but blades in the form of helical strips attached to the shaft by struts are preferred for mixing hard (i.e. viscous and coherent) doughs.

If desired a number of additional helical blades may be provided angularly displaced from the two helical blades already mentioned. By "helical blade" is meant a blade which defines at least a part helix.

Non-helical blades may also be provided and in one embodiment of the invention the two helical blades are located at opposite ends of the shaft and a pair of flat blades are located between the two helical blades. The blades are spaced apart from one another and three projections are provided, one located in each of the three spaces between the four blades.

In some applications the degree of mixing may be measured to some extent by the temperature of the mix. For example, in the mixing of certain doughs which undergo a change of physical consistency during mixing usually ascribed to the development of an elastic gluten network, and referred to as dough development, the degree of such dough development can be assessed from a knowledge of the temperature of the mix in conjunction with other qualities and preferably therefore a temperature sensor, e.g. a thermistor is provided in the leading edge of the, or one of the projections although the sensor may also be in a trailing edge. More than one projection may be provided.

The, or each, projection preferably extends from the bottom of the container and is preferably of a height greater than half the distance from the container bottom to the shaft.

The consistency of the dough (and thus the degree of mixing) may also be determined by the use of a measuring device exposed to the movement of the dough relative to a component of the mixer. The force exerted on the device by movement of the device relative to the dough is taken as a measure of the dough consistency.

The or one of the projections may be used to measure the force. For example the force could be measured by allowing limited pivotal movement of the projection about its base until dough force is balanced by an opposite force e.g. spring force. The angular displacement would then be measured by a suitable transducer (linear differential transducer, inductive pick-off, potentiometer etc.). Alternatively the force could be measured by the pressure on one part of the projection e.g. by the deformation of a metallic diaphragm suitably equipped with strain gauges.

Where only the two helical blades are present in the arrangement only one projection is generally used and in this event it is preferred that the projection substantially fills the distance between the swept volumes of the two blades.

The projection may, if desired, be hinged to the container about its trailing edge in such a manner that it remains rigidly covering a depression formed in the bottom of the container during operation but may be pivoted into the depression for unloading.

Each of the helical blades preferably comprises a 60° to 120° portion of the helix and an approximately 60° portion has been found to be particularly suitable for some applications while an approximately 90° portion has been found suitable for others.

Each of the helical blades preferably comprises a 60° to 120° portion of the helix and an approximately 90° portion has been found to be particularly suitable.

The lead angle of the helix is not critical but has a different optimum value for different materials in the mix. In general the lead angle should be more acute, the stiffer the material to be mixed, and has a maximum useful value of about 60°. A lead angle of 30° in an experimental version of the mixer gave satisfactory results on hard sweet biscuit doughs and bread doughs. Once the size of the container has been fixed, the lead angle and angular portion of helix used will be mutually dependent.

The speed of rotation of the shaft depends, inter alia, upon the properties of the material being mixed and the type of mixing required. In a small-scale experimental version of the mixer, a speed of approximately 100 r.p.m. was found particularly suitable for hard sweet biscuit doughs, although satisfactory mixing was obtained over a range of 50 to 140 r.p.m. Bread doughs were successfully developed at a speed of 170 r.p.m.

In commercially sized mixers (i.e. 40 to 2,000 lb. load) speeds of about 30 to 100 r.p.m. may be used with effect. Mixers of e.g. 40, 800 and 1,600 lb. capacity are envisaged as being commercially useful. The lower limit of the speed range is determined by factors such as whether the blades are solid, mesh, etc., and whether or not sufficient acceleration is imparted to the mix by one blade to throw it over onto the other. The upper limit is not critical and is determined by factors such as the power of the drive motor and to the viscosity of the dough.

The container is preferably pivotably mounted whereby the container may be pivoted to a position in which an open upper portion is directed downwardly for unloading purposes.

Where reference is made to a "single shaft" it is to be understood that this expression includes a split shaft arrangement.

Figure 2:
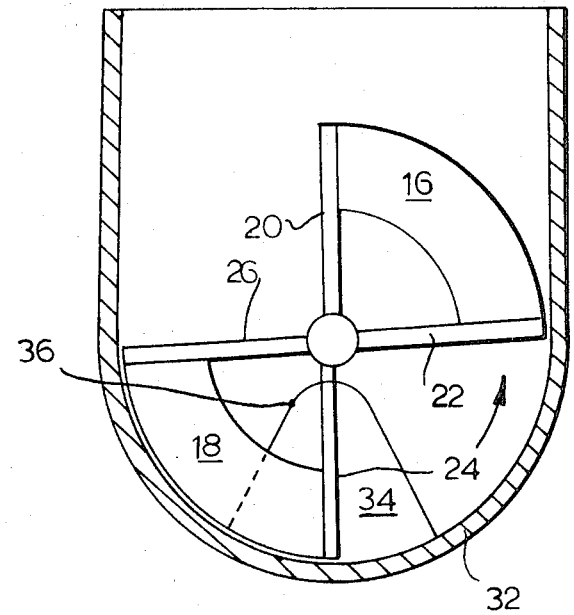
Figure 3:
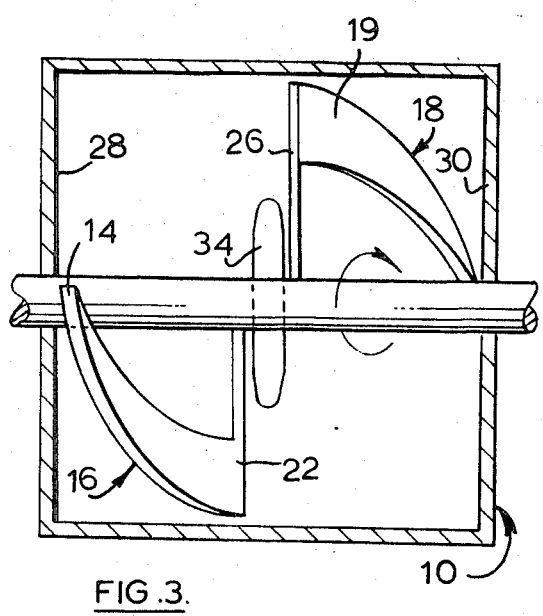

The invention will now be further described by way of example with reference to the accompanying drawings, in which:

FIG. 1 is a side view partly in section of a mixer embodying one form of the invention, FIG. 2 is an end view partly in section of the mixer of FIG. 1, and FIG. 3 is a plan view partly in section of the mixer of FIG. 1.

Referring now to the drawings, a mixer generally indicated at 10 includes a container 12 having a shaft 14 rotatably mounted therein. Rigidly attached to the shaft are two helical blades 16, 18. Each of the blades 16, 18 comprises an approximately 85° portion of a helix and includes a solid portion 17, 19 attached to the shaft by struts 20, 22, 24, 26 which space the solid portions 17, 19 from the shaft. The struts 20, 24 are adjacent end walls 28, 30 respectively, of the container 12 and the struts 22, 26 are each spaced from the mid point of the shaft 14.

Each helical blade 16, 18 has a lead angle of approximately 30°.

The helical blades 16, 18 are mounted in opposite sense and in such a manner that on rotation in the direction shown by the arrows in FIGS. 2 and 3 any material in the container will be moved towards the space between the swept volumes of the two blades. The cross-section of the lower portion 32 of the container 12 closely conforms to the cross-section of the lower portion of the swept volumes of the two blades 16, 18. A projection 34, known as a "sprag" is rigidly attached to the lower end of the container and is located in the space between the swept volumes of the two blades 16, 18. The projection is tapered towards its upper end and has a height equal to approximately seven-eighths of the distance between the shaft and the container. The thickness of the projection 34 is substantially the same as the distance between the swept volumes of the two blades 16, 18. The projection 34 carries a temperature sensing device 36 on its leading edge.

A stationary cover (not shown) covers the open top of the container 12 and includes openings to allow the container to be charged with the ingredients of the mix.

In operation the ingredients to be mixed, e.g. dough ingredients are placed in the hopper or container 12 and the shaft rotated in the direction shown by the arrows in FIGS. 2 and 3 by a motor (not shown). The material of the mix is impelled by each blade in a direction which has components in rotational and axial senses towards the fixed projection 34. On reaching the projection 34, further motion in these directions is interrupted and shearing of the material takes place, together with interchange from blade to blade. When mixing is completed the container is emptied. Emptying is assisted by arranging for the container 12 to be rotatable about the shaft 14, so that the open top moves out of engagement with the stationary cover (not shown) to a position in which the open top is approximately vertical. Emptying may be further assisted by slowly and/or intermittently rotating the shaft 14.

It will be appreciated that many modifications in the arrangement shown in the drawings may be made e.g. the solid portions may be other than solid, for example the solid portions maybe replaced by a wire mesh or gridlike material or the solid portions may be replaced by two helically shaped strips of material one at the outer edge of the solid portions and one at the inner edge of the solid portions. For thin doughs, it may be advantageous for the solid portions to extend right down to the shaft.

Another modification of the invention may utilize four helical blades. The blades are arranged in two pairs, the blades of a pair being at the same axial position on the shaft but spaced radially by 180°. The two pairs of blades are spaced axially apart on the shaft and are arranged radially such that the four blades are radially separated from each other by angles of 90°.

We claim:

1. A mixer including a container, a single shaft mounted for rotation within said container, and blades rigidly attached to said shaft wherein said blades are essentially helically shaped and are mounted on the shaft in axially spaced relation and in opposite sense to each other, a lower portion of said container having a cross-section which conforms closely to the cross-section of the lower portion of the swept volume of the blades; and at least one projection mounted on the inner surface of the container and extending between the volumes swept by the blades, whereby in operation the blades tend to move material in the container towards the portion of the container between said swept volumes of the blades.

2. A mixer according to claim 1 in which said helical blades comprise helical strips and struts, said strips attached to said shaft by means of said struts.

3. A mixer according to claim 1 in which the blades comprise a 60° to 120° portion of a helix.

4. A mixer according to claim 1 in which the lead angle of the helical blades is up to 60°.

5. A mixer according to claim 1 in which there are two helical blades and one projection mounted therebetween.

6. A mixer according to claim 5 in which said projection extends from the bottom of said container to a height greater than half the distance from the container bottom to the shaft.

7. A mixer according to claim 6 in which said projection substantially fills the distance between the volumes swept by said blades.

8. A mixer including a container, a single shaft mounted for rotation within said container, and blades rigidly attached to said shaft wherein said blades are essentially helically shaped and are mounted on the shaft in axially spaced relationship and in opposite sense to each other; a lower portion of said container having a cross-section which conforms closely to the cross-section of the swept volume of said blades; a projection mounted on the inner surface o said container and extending between the volumes swept by said blades; and a temperature sensing means mounted on the leading edge of said projection.

9. A mixer according to claim 6 in which the blades comprise a 60° to 120° portion of a helix.

10. A mixer according to claim 6 in which the lead angle of the helical blades is up to 60°.

11. A mixer including a container, a single shaft rotatably mounted within said container and two blades rigidly attached to said shaft wherein each of said blades comprises a 60° to 120° helical strip and struts, each strip mounted on said shaft by means of said struts in axially spaced relationship and in opposite sense to each other; a lower portion of said container having a cross-section which conforms closely to the cross-section of the swept volumes of said blades; and a projection mounted on the inner surface of said container which substantially fills the distance between the said swept volumes and extends from the bottom of said container to a height greater than half the distance from the container bottom to said shaft, whereby, in operation, the blades tend to move material in the container towards the portion of the container between said swept volumes.

* * * * *